Nov. 15, 1960 W. A. PLUMMER 2,960,561
SHIELDED WIRE HARNESS
Filed Oct. 1, 1957 2 Sheets-Sheet 1
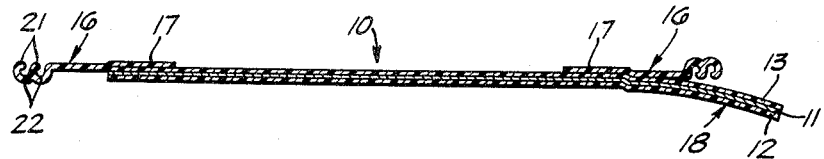
FIG. 1.
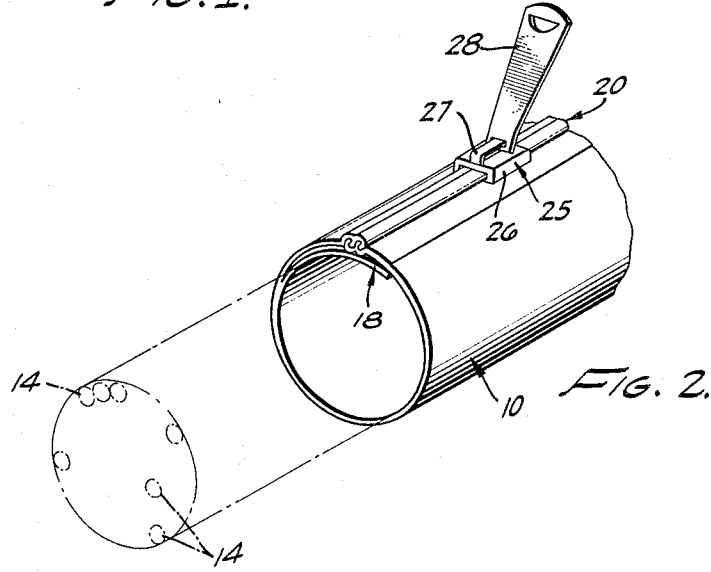
FIG. 2.
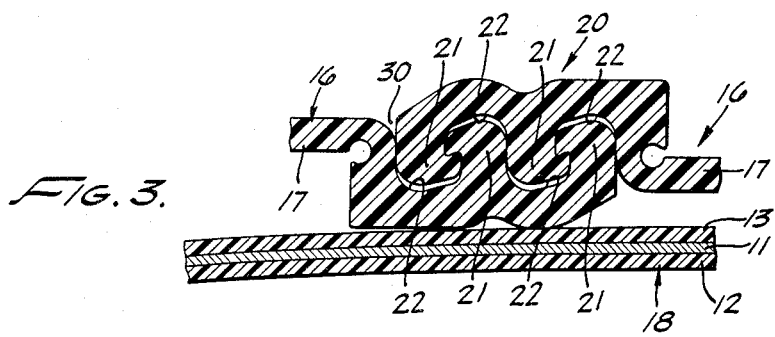
FIG. 3.
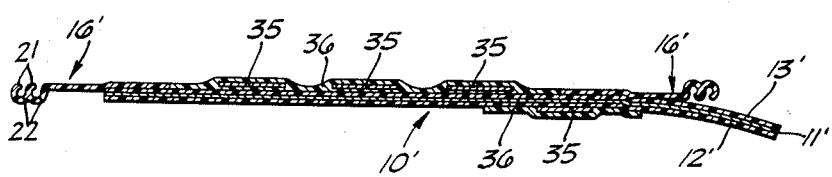
FIG. 4.
INVENTOR.
WALTER A. PLUMMER
BY
ATTORNEY

INVENTOR.
WALTER A. PLUMMER
BY
ATTORNEY

United States Patent Office 2,960,561
Patented Nov. 15, 1960

2,960,561

SHIELDED WIRE HARNESS

Walter A. Plummer, North Hollywood, Calif.
(3546 Crownridge Drive, Sherman Oaks, Calif.)

Filed Oct. 1, 1957, Ser. No. 687,476

20 Claims. (Cl. 174—36)

The present invention relates to a flexible tubing product and more particularly to an improved laminated tube made from continuous stripping and so formed that it can be made flat and assembled into fluid tight tubing at the point of use.

There are many instances in which it is desirable to have a flexible tubular enclosure for electrical members and adapted to be assembled about and disassembled from such members expeditiously and wherein the resulting enclosure is an effective shield preventing the passage of electrical fields either into or out of the tubular closure. It is well known to use electrically conductive material to enclose a space and wherein the conductive material acts when grounded to conduct away electrical fields thereby preventing the disruptive or undesirable influence of the fields on components located on the opposite side of the shield. However, there has not been provided prior to the present invention a satisfactory material incorporating a shielding conductor possessing the many advantages of the material herein disclosed. According to one embodiment of the invention flexible electrically-conductive material is laminated with impervious plastic material formed into long narrow strips of a suitable width to provide a tubular enclosure of the size desired. The opposite lateral edges of this flexible strip are provided with complementary tongues and grooves adapted to interlock with one another to provide a substantially fluid tight seam extending longitudinally of the tube. Preferably one strip of tongues and grooves overlies a guard flap of the laminated material to the end that the assembled tube includes in excess of a complete enclosure of electrically conductive material thereby safeguarding against the passage of electrical fields. The invention also contemplates the provision of one or more electrical conductors secured against the outer side of the plastic layer by an overlying flexible sheet of plastic material laminated to the main body of the tube to either side of the conductor. Preferably such conductors are of thin strip metal and not appreciably less flexible than the laminate. A multiplicity of such conductive paths may be provided i the wall of the electrically shielded material without objectionably increasing its thickness or flexibility.

Accordingly, it is a primary object of the present invention to provide an improved tubular enclosure for electrical members adapted to be detachably assembled about said members and including an electrically conductive shield member adapted completely to encircle the electrical members.

Another object of the invention is the provision of continuous strip material formed from laminated sheets of flexible conductive and non-conductive material, and having secured along the lateral edges of the laminate means forming a seam holding the laminated material secured together in tubular form.

Another object of the invention is the provision of an elongated strip of flexible material made principally from plastic and having embedded therein thin flexible electrical conductors extending lengthwise of the strip.

Another object is the provision of flexible tubing provided with a separable longitudinal seam and including a layer of metal completely encircling the tube with its lateral edges overlapping and in electrical contact to form a continuous tubular shield.

Another object is the provision of flexible tubular shielding formed in sections with their ends overlapping and featuring an exterior layer of flexible insulating material and a layer of electrically conductive material, the latter being in intimate conductive contact across the telescoped ends of adjacent tubular sections.

These and other more specific objects will appear upon reading the following specifications and claims and upon considering in connection therewith the attached drawings to which they relate.

Referring now to the drawings in which preferred embodiments of the invention are illustrated:

Figure 1 is a transverse sectional view through a laminated strip incorporating the present invention;

Figure 2 is a perspective view of the laminated strip formed into a tube and enclosing electrical components in the form of insulated wires;

Figure 3 is a transverse sectional view through the seam of the tube on an enlarged scale;

Figure 4 is a view similar to Figure 1 through a second embodiment of the invention;

Figure 5:
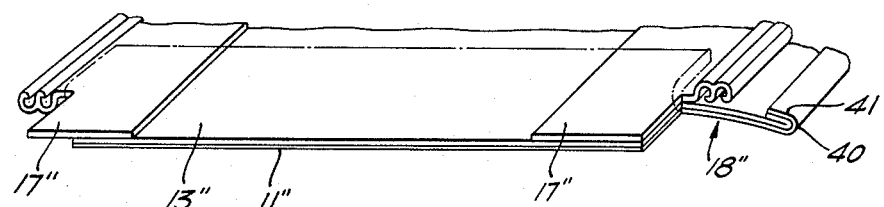
Figure 5 is a perspective view of one end of laminate as used in another embodiment of the invention.
Figure 6:
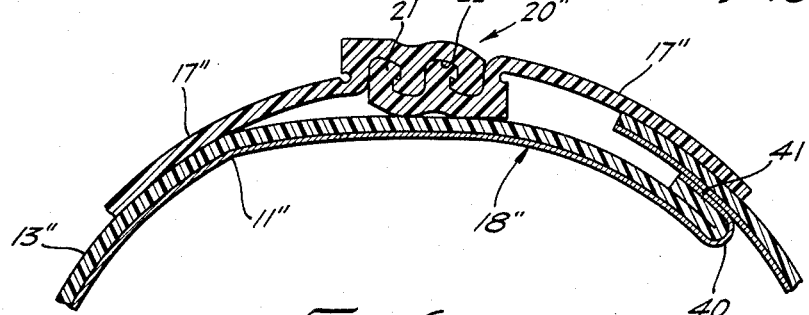
Figure 6 is a transverse sectional view on an enlarged scale through the seam of tubing formed from the laminate shown in Figure 5.

Referring now to Figure 1, there is shown a strip of laminated material designated generally 10 and including an intermediate layer of flexible electrically conductive material 11 sandwiched between similar layers of thin flexible non-conductive material 12 and 13, the latter being bonded to the opposite sides of layer 11 in any suitable manner. Although in the arrangement shown the laminate comprises three layers, it will be understood that for many purposes it is adequate to employ but a single layer of the non-conductive material and a single layer of the conductive material. The conductive material 11 may consist of either imperforate sheet material or perforated material as, for example, wire cloth formed from copper or aluminum wire. Preferably, however, the conductive layer consists of thin aluminum foil. If wire cloth is used as the conductive layer it is unnecessary to employ a bonding agent since the application of heat and pressure to the facing sheets of plastic 12 and 13 may be employed to fuse the layers together through the wire cloth In order to hold the laminated strip 10 assembled as a tubular harness about electrical members here indicated as a bundle of insulated wires 14, the opposite lateral edges of the laminated strip are preferably provided with similar slide fastener tapes 16, 16 having webs 17 suitably fuse bonded to outer layer 13 of the laminate. Preferably one of the tapes is bonded to one lateral edge along an area spaced inwardly from the edge proper of strip 10 to provide a guard flap 18 of laminated material positioned to underlie the seam of the tube in the manner illustrated in Figure 2.

The outer edges of tapes 16 may be suitably formed to provide complementary interlocking elements to provide a seam 20 extending longitudinally of the tube and effective to hold it closed in a substantially fluid tight manner. One particularly suitable manner of forming these tongues and grooves is illustrated in Figure 3 wherein it will be seen that the tape is provided with a pair of tongues 21 adapted to seat within complementarily shaped grooves 22 both extending longitudinally along the edge of tapes 16. Desirably, the plastic material from which tapes 16 are formed has a shore hardness somewhat greater than that employed for sheets 12 and 13 since the higher shore hardness provides a stronger and fail-proof seam 20. A lower shore hardness is desirable for sheets 12 and 13 in the interest of greater flexibility and ease of handling.

To aid in interlocking tongues 21 in grooves 22, seam 20 may be provided with a conventional type slide device 25 comprising a unitary metal body 26 provided with a pair of converging channels each adapted to receive one edge of the mating tapes 16, 16. Loosely pivoted to a slideway 27 on the exterior of body 26 is a finger piece 28 conveniently grasped between the thumb and finger while pulling the device along the seam. It will be understood that when the device is pulled in one direction it forces the tongues and grooves together, and in the opposite direction it separates the tongues and grooves so that the tube may be removed from the electrical elements 14. Once the tube has been closed about the electrical members the slide device may be removed, or it may be left in place as desired. If the electrical elements to be enclosed by the tube substantially fill the tube, the tongues and grooves may be mated swiftly and accurately without the slide device and merely by the application of finger pressure against the outer one of the tapes while properly aligned with the underlying tape. It will also be understood that if desired, a sealing compound may be applied along joint 30 following the closure of the seam. Normally, however, such a sealing agent may be dispensed with since the tongues and grooves 21, 22 interfit so closely as to form a mechanically strong fluid-tight seam.

Referring now to the embodiments illustrated in Figure 4, there is shown a laminated strip 10' having the same general structure described above in connection with Figure 1 including a flexible electrically conductive layer 11' bonded between flexible layers of plastic 12' and 13'. Slide fastener tapes 16', 16' are provided along the opposite edges of the strip material as described above and for a similar purpose. This embodiment differs primarily in the inclusion of a plurality of electrical conductors preferably provided by thin strips of electrically conductive strips 35, 35 applied flat against one surface of the laminated strip and firmly bonded thereto in spaced apart relation by a covering layer 36 of sheet plastic. A single strip of plastic 36 of suitable width suffices for a plurality of strips, this material being firmly bonded to plastic sheet 13' to either side of strips 35. It will be understood that conductive material 35 may be of any shape and material. However, it is preferably ductile and flat to avoid increasing the thickness of the laminate and to avoid projecting objectionably above the surface of the tube wall proper. For many purposes metal foil has adequate capacity while for other applications requiring greater capacity, heavier conductive material such as wire, will be desirable.

The strip illustrated in Figure 4 is assembled about electrical components or wiring in the same manner described in connection with Figures 1 to 3, and in addition to providing an electrical barrier against flux fields, the tube wall itself includes one or more independent conductive paths electrically insulated from one another. It will be understood that these conductors may be formed inside or outside shielding layer 11' or, if desired, on both sides thereof to the end that layer 11' is effective to prevent interference between currents flowing in the conductors to either side thereof.

Although a great variety of commercally available plastic materials are suitable for use in making the described structure, the polyethylene and the vinyl plastics, of which there are many forms of both, may be used in forming both the main body of the tube and the slide fastener tapes. Alternatively, different plastic materials may be used in combination.

The embodiment shown in Figures 5 to 8 is generally similar to those described above differing primarily in the omission of the inner plastic layer thereby leaving the foil layer 11'' exposed on the interior side of the assembled tubing and flexible layer of plastic 13'' intimately bonded to its outwardly facing surface. The exposed free edge 40 of guard flap 18 is turned back upon itself with the contacting surfaces of the plastic layer securely bonded or fused together by a suitable adhesive or by heat and pressure to provide a narrow strip 41 of metal foil extending the full length of the guard flap. Strip 41 is positioned to lie in intimate conducting contact with the juxtaposed surface of layer 11'' in the manner clearly illustrated in Figure 6. The opposite lateral edges of the strip material used in forming the tubular sections 10'' are provided with slide fastener tapes 17'', 17'' having interlocking tongues 21'' and grooves 22'', such as those described above, interlocking to provide a longitudinal seam 20''.

Figure 7:
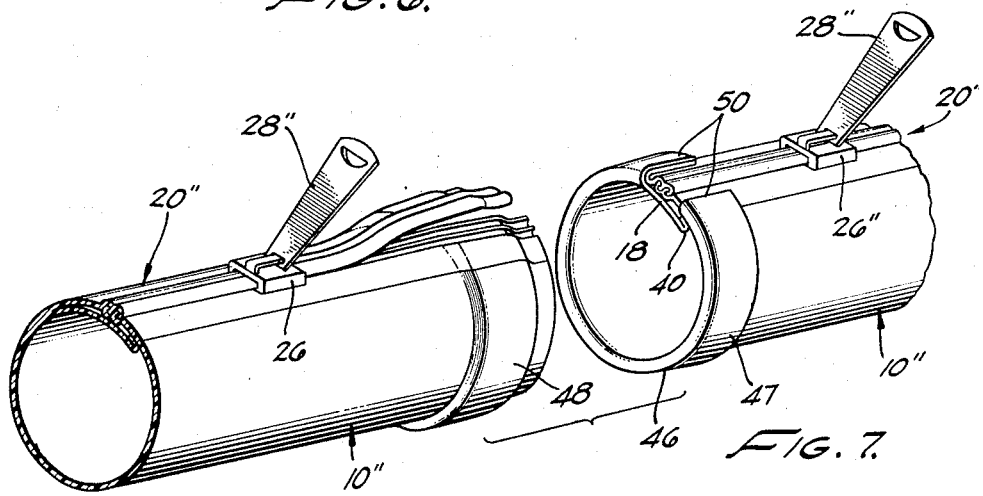
Figure 7 is a perspective showing the adjacent ends of two tubular sections in position for final telescopic assembly.
Figure 8:
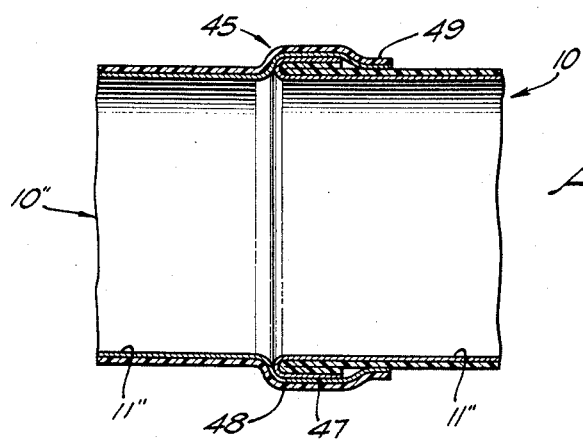
Figure 8 is a side view through the assembled ends of two tubing sections with portions of the walls broken away to show assembly details.

Referring to Figures 7 and 8 it will be seen that the opposite ends of sections 10'', 10'' are preferably specially and differently formed to interlock with one another to form a fluid-tight circumferential joint designated generally 45. For this purpose, one end of each section is notched by cutting away a rectangular portion of the outer corners including a portion of guard flap 18'' and the intervening strip is turned back upon itself as indicated at 46 and the contacting surfaces of the plastic layer 13'' are bonded together to provide a wall of double thickness, one portion of which is coextensive with the main wall of the tube and the other half of which projects radially beyond the surface of such main body. Furthermore and importantly, as is made clear by Figures 7 and 8, the inner layer of metal foil 11' has an exposed cylindrical surface 47 exposed on the exterior of the tubing end whereby the assembly of adjacent end 48 of another tubing section thereover in the manner best shown in Figure 8 provides a snug joint with the interior metal surface of the one tubular section in firm electrically conducting contact with the underlying band 47 of the other tubular section. Preferably the female end 48 of the tubular section has an end lip 49 of smaller diameter than the overturned end 46 so that upon closure of slide fastener device 28'' the tubular sections are rigidly locked together with all adjacent surfaces of the metal foil in intimate electrical contact. To insure a strong interlocking fit between the tube ends, the female end of each section may be, and preferably is, provided with a shallow inwardly opening annular channel having a depth substantially equal to the double thickness of the overturned end of the male tube end. This channel may be formed by holding the flattened tubular strip in a suitable mold under heat and pressure, the material being held under pressure until the plastic material has cooled to take a set.

As is made evident by Figure 7, the overturned end 46 of the tube is notched at the end to be turned back so that the ends 50, 50 of the turned back portion lie closely beside the tongue and groove portion of the slide fastener tapes. Likewise, a similar length of guard flap 18'' is cut away so that its end wall lies even with the ends of seam 20'' in the closed position of the latter. It will be understood that the ends of the tubular sections may be notched in various ways adjacent the slide fastener tapes to facilitate the assembly of the tubular ends together, the primary considerations being the maintenance of a continuous metal closure strip adapted to be held in intimate electrical contact for the full length of each tubular section by the contact of the overturned lip edge 40, 41 of the guard flap with the adjacent wall portion of the metal shield when the longitudinal seam is closed. Likewise, the overturned end of each tubular section has an exposed layer 47 of metal foil lying in intimate contact with the metal covered bottom of the shallow groove in the female portion of the adjacent tubular section.

Although the joint between the overlapped ends of the tubular sections described in Figures 5 to 8 include a layer of metal foil, it will be understood that the unusually strong and fluid-tight joint provided both longitudinally and circumferentially of a multiple section enclosure is not dependent on the presence of the metal foil and that the described type of joint is found equally effective in tubular wire harness formed entirely of plastic as well as of foil sandwiched between layers of plastic as illustrated in Figure 1. Although insulated electrical conductors are not shown bonded to the embodiments shown in Figures 1 and 5 to 8, it will be recognized that each could be so constructed if desired.

While the particular electrically shielded flexible tubular material herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. An electrically-shielded flexible tubular enclosure for electrical elements impervious to fluids comprising, a thin flexible sheet of material laminated from thin sheet plastic and thin sheet metal, said sheet having substantially fluid-tight slide fastener tapes secured along opposite lateral edges thereof adapted to interlock with one another and cooperating with said plastic material to provide a fluid-tight enclosure for electrical elements all exposed exterior portions of which are electrically non-conducting, said laminate including a layer of metal completely encompassing said electrical elements with its longitudinal edges in electrically conducting contact and adapted to be grounded so that electrical fields are prevented from passing through said metal sheet in either direction.

2. An enclosure as defined in claim 1 characterized in that said sheet of metal comprises aluminum foil.

3. An enclosure as defined in claim 1 characterized in that said laminated sheet material comprises a layer of aluminum foil bonded between sheets of thin plastic.

4. An enclosure as defined in claim 1 characterized in that said slide fastener tapes comprise identical plastic tapes fuse-bonded to the plastic layer of said laminated material and having a plurality of oppositely-facing complementary tongues and grooves extending therealong adapted to interlock with one another and cooperating with said laminated material in forming an elongated tubular harness for wiring having a fluid-tight seam extending longitudinally along one side thereof.

5. An enclosure as defined in claim 4 characterized in that one of said slide fastener tapes is bonded to said plastic layer inwardly from one edge to provide a guard flap adapted to underlie said seam in the closed position thereof.

6. An electrically shielded unitary tubular wire harness for electrical conductors comprising an elongated strip of flexible sheet laminate including one flexible electrically conductive strip of metal having one surface exposed and a strip of flexible impervious electrically non-conductive material, said laminate having flexible fluid-tight slide fastener tapes heat fused along the opposite lateral edges of said non-conductive material and interlocking with one another to provide a continuous seam extending longitudinally of the tubular enclosure so formed, one of said slide fastener tapes being spaced inwardly from and parallel to one lateral edge of said strip of laminate to provide a flap sufficiently wide to bridge said seam whereby said metal strip completely encircles said tubular harness in the assembled condition thereof.

7. An electrically shielded separable tubular enclosure formed from elongated strips of flexible laminated material, said material including a layer of flexible electrically conductive material sandwiched between layers of non-conductive material, and means extending along the lateral edges of said laminated strip for locking said edges separably together in a seam extending longitudinally of said tubular enclosure and with the lateral edges of said layer of electrically conductive material in overlapping relation to provide a complete tube of metal.

8. A tubular enclosure as defined in claim 7 characterized in the provision of strips of electrically conductive material extending longitudinally of said laminate and secured thereto in spaced apart relation by a layer of thin flexible non-conductive material bonded to said laminated strip to either side of said strips of conductive material.

9. A flexible tubular member adapted to be made and shipped to the point of use in a flat elongated strip for subsequent assembly into a flexible tube, said member comprising continuous flexible strips of electrically conductive material sandwiched in spaced apart relation between continuous strips of thin flexible plastic material, and interlocking slide fastener tapes secured to the opposite lateral edges of said flat strip and adapted to interengage to form a tubular member having a plurality of electrical conductors embedded within the wall thereof and extending the full length of the tube.

10. A flexible hollow tubular electrical shield for enclosing cables of wires and the like comprising a plurality of sections of flexible tubing provided with longitudinal separable seam means and adapted to have their adjacent ends overlapped to provide a tubular joint, each of said sections being formed of laminated layers of metal and flexible insulating material, one end of each section having narrow portions thereof turned back against the juxtaposed laminated main body of said flexible tubing section with the layer of metal in the turned-back portion facing in the opposite radial direction from the remainder of said metallic layer in that section and adapted to provide a metal-to-metal electrically conductive path between adjacent tubular sections when the adjacent ends of said tubular sections are telescoped together, and means integral with at least one of said sections for holding said contacting metal surfaces together in good electrically conducting relation.

11. A tubular shield as defined in claim 10 characterized in that said sections are split longitudinally and include means integral with the adjacent edges of said split for holding the same together.

12. A tubular shield as defined in claim 11 characterized in that said means for holding the edges of said longitudinal split together includes an interior guard flap attached to one of said edges and having an exposed edge portion of said electrically conductive shield positioned to lie in intimate contact with an exposed surface portion of the shield along the opposed edge of said split when the same is closed to form a tube.

13. A removable tubular enclosure embodying therein an electrically conductive shield coextensive with the surface area of said tubular enclosure, said enclosure including a separable seam extending longitudinally of the exterior of said enclosure having integral with one edge a guard flap, said guard flap having an exposed surface area of said electrically conductive shield positioned beneath said seam and in intimate conducting contact in the closed position of said seam with an exposed surface area of said shield extending along the interior side of the adjacent edge of said seam.

14. A flexible tubular harness made in sections and adapted to be assembled about cable, conduits and the like, said harness comprising similar width elongated strips of flexible plastic sheeting having slide fastener means extending along their opposite lateral edges and adapted to interlock to form longitudinal seams along the respective tubular sections, one end of said sections being reinforced with a low-height narrow band extending circumferentially of said tubular sections and projecting outwardly radially beyond the surface of said harness, the other end of one of said sections having a complemental inwardly opening annular groove adapted to seat over and interlock with said band and cooperating therewith as the longitudinal seam of one of said sections is closed to lock the overlapped ends of the sections coupled together without need for inserts, reinforcing members, fasteners and the like.

15. A tubular harness as defined in claim 14 characterized in that said band is formed by the overturned end of one of said sections with the contacting surfaces thereof secured together to provide an axially narrow band extending circumferentially of the section end.

16. An impervious electrically-shielded flexible laminated enclosure for electrical elements comprising, a thin flexible strip of high dielectric strength material having a substantially thin flexible covering of electrically conductive material on one surface thereof, said covering material extending around one lateral edge of said strip and including a band parallel to and exposed on the opposite surface of said strip from said covered side, and separable interlocking fluid-tight seam means secured to said laminated enclosure, said seam means being formed in two separate strips at least one of which is secured to said laminate inwardly of the edge thereof covered with said electrically conductive material and the other of which is secured to the opposite lateral edge portion of said laminate.

17. A disassembable tubular enclosure having a longitudinal separable seam formed by complementally shaped interlocking parts along the lateral edge portions thereof, the main body of said tubular enclosure being formed of laminated material one layer of which is non-conducting and another of which is metallic and electrically conductive, a portion of said laminated material at one end of said tubular enclosure being overturned outwardly against the exterior surface of said enclosure with the outwardly facing surface of its metallic layer exposed and adapted to be contacted by the inwardly facing exposed surface of the metallic layer of a second similar laminated tubular enclosure when telescoped over the overturned portion of said first mentioned tubular enclosure.

18. A tubular enclosure as defined in claim 17 characterized in the provision of means for permanently holding said overturned portion pressed firmly against the juxtaposed outer surface of said tubular enclosure.

19. A tubular enclosure as defined in claim 17 characterized in that said non-conducting layer of said tubular enclosure comprises flexible plastic material and further characterized in that said separable seam is non-metallic and formed by interlocking tongue and groove means formed of flexible plastic material.

20. A tubular enclosure as defined in claim 17 characterized in that said laminated main body includes a narrow strip portion along one longitudinal edge adapted to form a guard flap underlying said separable seam, the free lateral edge of said guard flap being overturned outwardly with its exposed metallic surface facing outwardly and positioned to contact the juxtaposed inwardly facing exposed metal surface of the juxtaposed main body of said tubular enclosure in the closed position of said separable seam thereby to provide a continuous tubular metal shield from end to end of said tubular enclosure.

References Cited in the file of this patent

UNITED STATES PATENTS

| | | |
|---|---|---|
| 2,215,880 | Lasley | Sept. 24, 1940 |
| 2,297,735 | Allen | Oct. 6, 1942 |
| 2,447,168 | Dean et al. | Aug. 17, 1948 |
| 2,522,072 | Tierney | Sept. 20, 1950 |
| 2,585,054 | Stachura | Feb. 12, 1952 |
| 2,647,160 | Hood | July 28, 1953 |
| 2,666,466 | Sharat | Jan. 19, 1954 |
| 2,756,172 | Kidd | July 24, 1956 |
| 2,824,575 | Rosen | Feb. 25, 1958 |

FOREIGN PATENTS

| | | |
|---|---|---|
| 204,706 | Great Britain | Oct. 9, 1924 |